June 21, 1960
E. F. ELMS ET AL
2,941,768
TUBING FASTENER
Filed Sept. 22, 1958
3 Sheets-Sheet 1
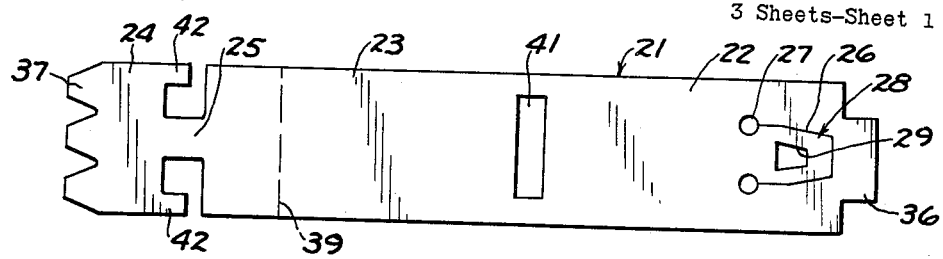
FIG. 1
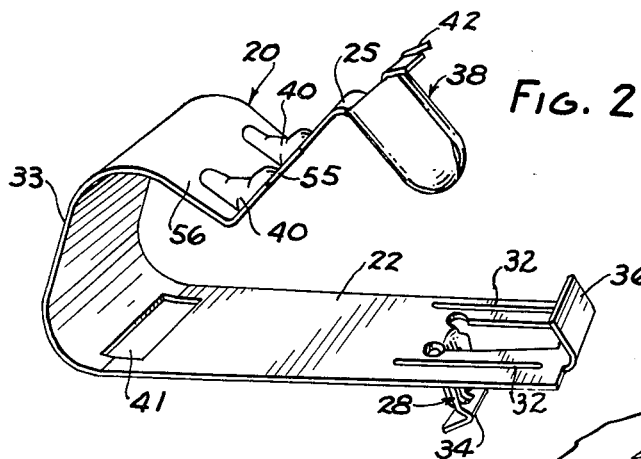
FIG. 2
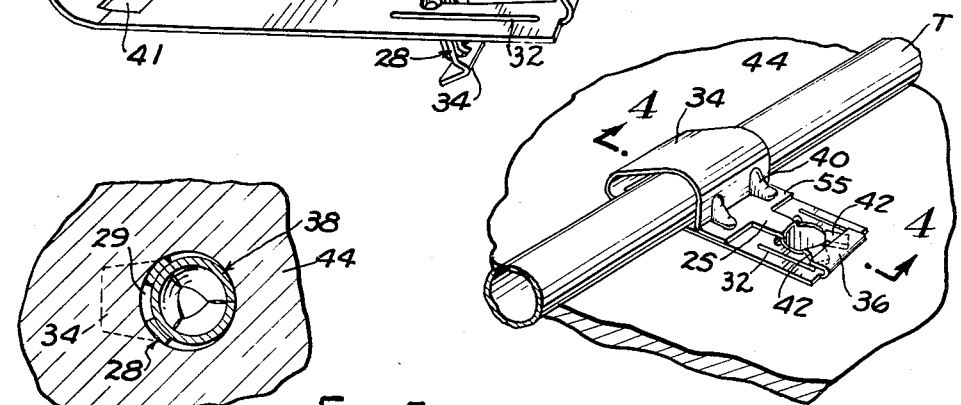
FIG. 3
FIG. 5
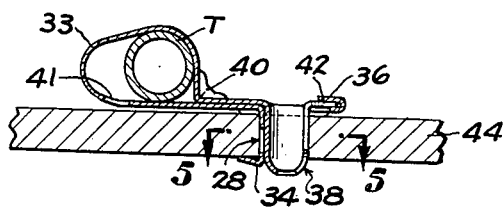
FIG. 4
INVENTORS
EDWIN F. ELMS, THOMAS B. SAUNDERS
& JOHN R. WELLS
BY
Barnes, Kisselle, Raisch & Choate
ATTORNEYS

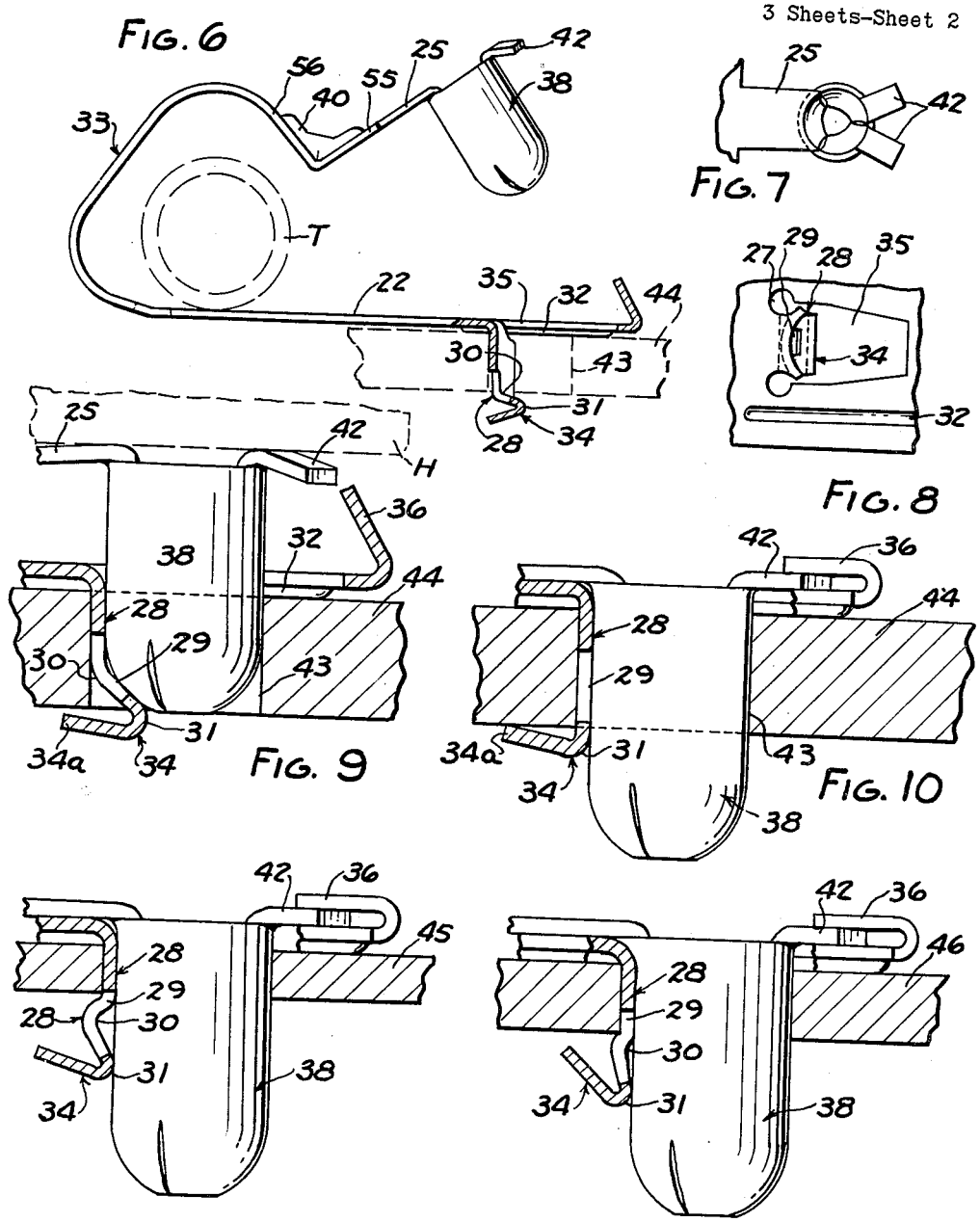

June 21, 1960 E. F. ELMS ET AL 2,941,768
TUBING FASTENER
Filed Sept. 22, 1958
3 Sheets-Sheet 3

INVENTORS
EDWIN F. ELMS, THOMAS B. SAUNDERS
& JOHN R. WELLS
BY
Barnes, Kisselle, Raisch & Choate
ATTORNEYS

United States Patent Office 2,941,768
Patented June 21, 1960

2,941,768
TUBING FASTENER

Edwin F. Elms, Roseville, Thomas B. Saunders, St. Clair Shores, and John R. Wells, Detroit, Mich., assignors to Robert L. Brown, Ferndale, Mich.

Filed Sept. 22, 1958, Ser. No. 762,470

18 Claims. (Cl. 248—71)

This invention relates to tubing fasteners and particularly to fasteners for mounting a tubing on a wall.

Wherever tubing or conduits are used, such as in oil or gas lines of an automobile or the hoses of a hot water heater, it is necessary or desirable to mount and support the tubing at spaced points in order to maintain it in position. It has been customary to first fasten a clip by suitable means to a wall panel or other support on which the tubing is to be mounted and thereafter mount the tubing on the clip.

It is an object of this invention to provide a tubing fastener constructed such that the mounting of the fastener on the wall panel and the mounting or securing of the tubing on the fastener can be performed in one operation.

In the drawings:

Fig. 1 is a plan view of a blank used in fabricating a fastener embodying the invention.

Fig. 2 is a perspective view of a fastener embodying the invention.

Fig. 3 is a fragmentary perspective view showing the fastener in tubing-supporting position.

Fig. 4 is a fragmentary sectional view taken along the line 4—4 in Fig. 3.

Fig. 5 is a fragmentary sectional view taken along the line 5—5 in Fig. 4.

Fig. 6 is a side elevational view, partly in section, of the fastener shown in Fig. 2, the fastener being in position for receiving a tubing.

Fig. 7 is an end view of the nose portion of the fastener shown in Fig. 6.

Fig. 8 is a fragmentary plan view of a portion of the fastener shown in Fig. 6.

Figs. 9 and 10 are fragmentary sectional views on an enlarged scale showing the relative position of various parts of the fastener during and after mounting of the fastener respectively.

Figs. 11 and 12 are fragmentary sectional views showing the manner in which the fastener is designed to engage with wall panels of various thicknesses.

Figure 13:
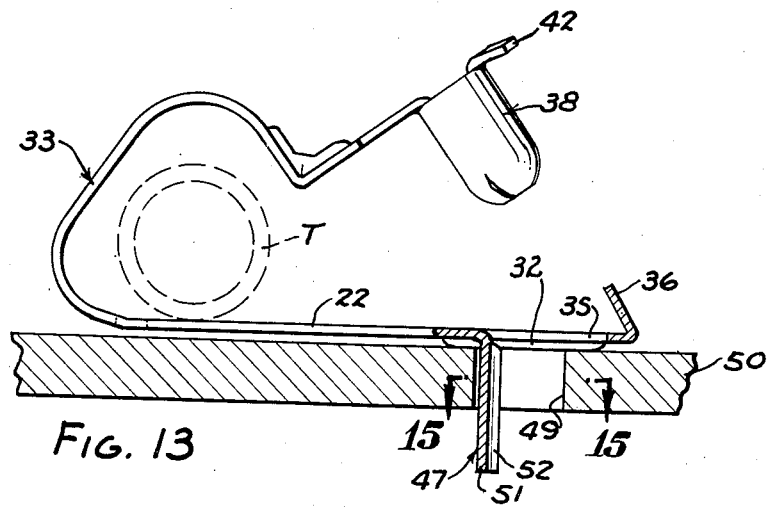
Fig. 13 is a fragmentary sectional view showing a modified form of the fastener.

Referring to Figs. 1 and 2, tubing fastener 20 is made from a blank 21 comprising a generally rectangular strip of deformable material such as sheet metal and including a first section 22, a second section 23 connected at one end to first section 22 by tabs formed by an opening 41 and a third section 24 connected to the other end of section 23 by a connecting tab 25.

As shown in Fig. 1, first section 22 which forms the base of the clip includes a generally U-shaped slit 26 and small circular openings 27 at the ends of the slit, thereby defining a tab 28 which is bent downwardly generally at a right angle to the plane of base 22 along an arcuate line connecting the centers of the openings 27 as shown in Fig. 2.

As is shown in the drawings, tab 28 is provided with a generally central aperture 29 preferably, but not necessarily, having the same general shape as tab 28. Tab 28 is fashioned into arcuate cross section as illustrated, and the free end thereof is bent transversely through opening 29 as at 30 and reversely as at 31 to form a panel engaging locking projection 34.

Along each side of the opening 35 defined by slit 26, base 22 is formed with reinforcing embossments 32. As is shown in Fig. 8, the side edges of opening 35 diverge slightly in a direction toward openings 27. The free end of base 22 is provided with an upward and inwardly bent tab 36.

As shown in Fig. 1, the free end of third section 24 is provided with triangular notches, thereby defining generally triangular tabs 37. Section 24 is bent into cylindrical shape with tabs 37 turned inwardly to form a round ended, generally cylindrical nose 38. The diameter of nose 38 is approximately equal to the maximum width of opening 35. Section 24 is also bent at its line of juncture with connecting tab 25 so that the axis of nose 38 is generally at a right angle to the plane of tab 25 (Fig. 6). Second section 23 of the blank, which forms the tube engaging portion of the fastener, is bent about a transverse folding line 39 so that portion 55 thereof to which tab 25 is connected is at a generally right angle to the adjacent portion 56 of section 23. Reinforcing ribs 40 are embossed along folding line 39.

Blank 21 is bent about a transverse line through the axis of opening 41 and also intermediate the ends of section 23 to form a generally curved portion 33 which is adapted to be wrapped about a section of tubing T as shown in Fig. 6. Curved portion 33 has a flat center part and curved ends as illustrated.

Third section 24 is formed with locking tabs 42 which are bent slightly downwardly in the direction of the nose 38 and cooperate with locking tab 36 as presently described to lock nose 38 in engaged position.

To mount a tubing or conduit on a wall panel, the fastener is positioned with tab 28 projecting through an opening 43 in the wall panel 44 on which the tubing T is to be mounted. The diameter of opening 43 is substantially the same as the largest transverse dimension of opening 35 in base 22. With the fastener 20 seated against the panel as shown in Fig. 6, tubing T is placed in the fastener between base 22 and curved portion 33. Nose 38 is then manually forced downwardly through opening 35 to the position shown in Fig. 9. It will be noted that tabs 42 will clear tab 36 upon further downward movement. Nose 38 is then driven further as by a hammer blow to drive it to its lowermost locking position shown in Fig. 10. As the hammer head H travels downwardly as viewed in Fig. 9, it drives tabs 42 past the upper edge of tab 36 and then engages tab 36 and bends it downwardly over tabs 42 to the locked position illustrated in Fig. 10. At the same time, the curved portion 33 of the fastener is bent downwardly to securely clamp the tubing (Fig. 4).

As the cylindrical nose 38 is driven downwardly through the opening 43 in the wall panel, the rounded end thereof engages the projection 34 and straightens the tab along the bend 30 which is relatively because of the opening 29. This causes the free end 34a of projection 34 to swing upwardly and clinch against the underside of the panel as shown in Fig. 10. In the arrangement shown in Figs. 9 and 10, it will be observed that the thickness of panel 44 is related to the length of tab 28 such that the bend line 30 of the tab lies intermediate the upper and lower faces of the panel. More specifically, the relationship is such that the opening 29 terminates at its lower end in a plane closely adjacent the lower face of the panel 44.

The fastener of the present invention is designed so that it can be used with panels of different thicknesses. For example, in Fig. 11, the fastener is shown mounted on a panel 45 which is substantially thinner than the panel 44. The thickness of panel 45 is such that the upper end of opening 29 is adjacent the lower face of the panel. When the fastener is employed on a relatively thin panel such as shown at 45 and the nose 38 is driven through the opening in the panel, the rounded end thereof will distort the tab 28 along a line adjacent the upper edge of opening 29 as illustrated to clinch the fastener securely on the panel.

In Fig. 12, the fastener is shown clinched on a panel 46 having a thickness intermediate panels 44 and 45. In this arrangement, the lower face of the panel lies in a plane intermediate the bend line 30 and the upper edge of opening 29 in tab 28. With a panel of such intermediate thickness, the rounded end of nose 38 distorts the tab 28 at the weakened section thereof along a line slightly above the bend line 30 to securely clinch the fastener on the panel. Thus, the fastener is designed such that with a single hammer blow, the fastener can be clinched on a panel and simultaneously therewith, the tubing is secured by the fastener to the panel.

Figure 14:
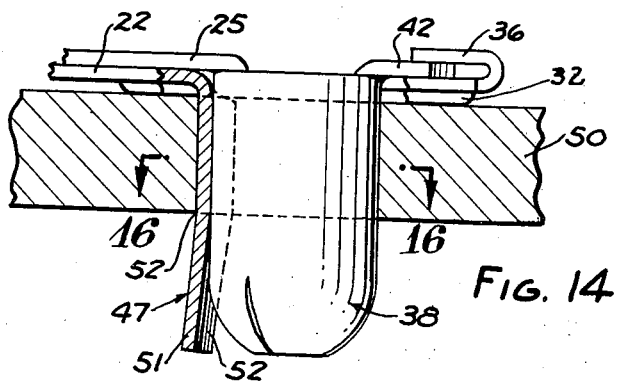
Fig. 14 is a fragmentary sectional view on an enlarged scale of the modified form of fastener shown in Fig. 13 after mounting.
Figures 15, 16:
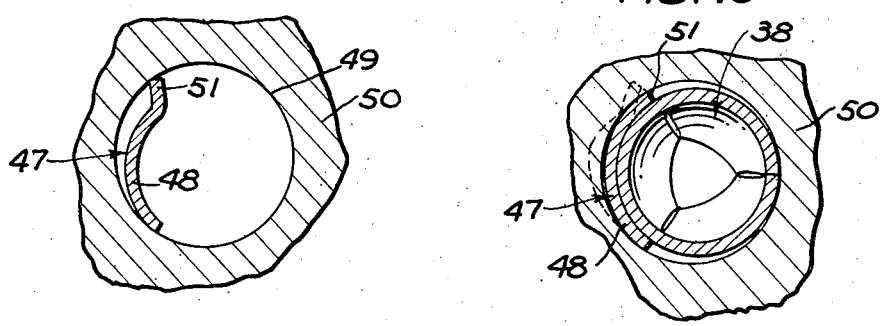
Fig. 15 is a fragmentary sectional view taken along the line 15—15 in Fig. 13.
Fig. 16 is a fragmentary sectional view taken along the line 16—16 in Fig. 14.

A modified form of the invention is shown in Figs. 13 through 16, wherein tab 47 is initially formed with a major portion 48 thereof having a lesser radius of curvature than opening 49 of wall panel 50 into which tab 47 projects. In addition, a vertical edge portion of tab 47 is bent radially outwardly to form a lip 51. When the fastener is positioned on panel 50 for mounting a tube, the tab is oriented in the manner shown in Fig. 15. As nose 38 is driven through opening 49, it deforms that part of portions 48, 51 of tab 47 which is adjacent the wall of opening 49 into and against the wall of opening 49. The portions of tab 47 below the lower face of the panel are bent radially outwardly as shown at 52 in Fig. 14 to clinch the fastener in position on the panel. This form of fastener is otherwise identical to that shown in Figs. 1 through 12.

We claim:

1. A sheet metal fastener for mounting tubing on a wall panel comprising a base having an opening therein and a deformable tab adjacent the edge of the opening, said tab projecting downwardly generally transversely of the plane of the base, said fastener including an arched portion extending upwardly from the base and terminating in a nose member generally overlying said opening, said arched portion being displaceable to direct said nose member, when struck with a downward force, axially through said opening, said tab providing an obstruction to the free passage of said nose member through said opening, said arched portion between its connection with said base and said nose member having a portion bent upwardly to define a recess for a tube when the nose member is driven downwardly through said aperture, whereby when the fastener, having a length of tubing extending through said recess, is positioned against a wall panel with the opening in the base overlying an opening in the panel and the tab extending through the opening in the panel and said nose member is driven through said openings, said arched portion is displaced toward the base to securely engage the tube on said fastener and the nose member deforms said tab to clinch the fastener on the wall panel, said fastener being formed of a non-resilient, permanently distortable sheet metal.

2. A fastener as called for in claim 1 wherein said base is provided with a lug inclined upwardly toward and adjacent said opening and said arched portion is provided with a lug adjacent said nose member and aligned with said first mentioned lug which, when the nose member is driven downwardly through said opening, just clears the upper end of the inclined lug, whereby when the nose member is driven downwardly as by a hammer blow, the inclined lug is engaged by the head of the hammer and clinched over the lug on the arched portion.

3. A fastener as called for in claim 2 wherein said lug on the arched portion has the free end thereof disposed below the plane of the upper end of the nose member.

4. A fastener as called for in claim 2 wherein the lug on the arched portion extends from the upper end of the nose member in a downwardly inclined direction.

5. A fastener as called for in claim 1 wherein said base and arched portion are connected along a weakened portion of the fastener to facilitate bending at said weakened portion.

6. A tubing fastener for mounting tubing on a wall having an opening therein comprising a first section having an opening therethrough at one end thereof and adapted to overlie the opening in said wall, a second section connected to the other end of said first section and adapted to be wrapped around a piece of tubing, said second section having a downwardly projecting nose portion at the end thereof which is furthermost from said first section, said nose portion being adapted to be driven downwardly through the opening in said first section, a tab integral with said first section and bent downwardly out of the plane thereof from a point on the periphery of the opening in said first section which is remote from said one end of said first section, said tab having a projection thereon extending radially inwardly of said opening in said first section and providing an obstruction to the passage of said nose portion of said second section through said opening in said first section, said fastener being formed of a non-resilient, permanently deformable material whereby when said fastener is positioned with the tab of said first section extending into the opening in said wall and said nose portion is driven through said opening in said first section, said nose portion contacts said projection and deforms a portion of said tab in a direction radially outwardly of said opening to secure the fastener to said wall.

7. The combination set forth in claim 6 wherein said nose portion is generally cylindrical, the forward end thereof being tapered inwardly.

8. The combination set forth in claim 7 wherein the transverse dimension of the opening in said first section is substantially equal to the diameter of said nose portion.

9. The combination set forth in claim 6 wherein said second section comprises a first portion connected to said nose portion and having its plane forming a generally right angle with the axis of the nose portion, a second portion being connected to said first portion and having its plane forming a generally right angle with said first portion, and a third portion connecting said second portion to said first section of the fastener.

10. A tubing fastener for mounting tubing on a wall having an opening therethrough comprising a strip of non-resilient, permanently deformable sheet metal comprising a first section having an opening therethrough adjacent one end thereof, a second section connected to the other end of said first section and adapted to wrap around a length of tubing, said second section being formed with a nose portion generally overlying and adapted to be driven through the opening of said first section, said first section including a tab integral therewith and extending downwardly from the plane thereof at the periphery of said opening, said tab having an aperture intermediate the ends thereof and a projection extending radially inwardly of said opening and forming an obstruction in the path of said nose portion when driven through said opening whereby when said nose portion is forced through said opening, it abuts against said projection and deforms portions of said tab radially outwardly of said opening.

11. The combination set forth in claim 10 wherein the projection on the tab is formed at least in part at the apertured portion of the tab.

12. A tubing fastener for mounting tubing on a wall having an opening therethrough comprising a strip of non-resilient, permanently deformable material comprising a first section having an opening therethrough at one end thereof, a second section connected to the other end of said first section, said second section being formed with a depending nose portion overlying and adapted to be driven through the opening of said first section, said first section including a tab integral therewith and extending downwardly from the plane thereof at the periphery of said opening, said tab having an aperture therein, said aperture being spaced from the free end and side edges of the tab, said tab being bent radially inwardly of said opening along a transverse line passing through said aperture and being bent radially outwardly along another transverse line between said first transverse line and the free end of the tab, said bent portions of the tab defining an obstruction to the free passage of said nose portion through said opening whereby when said nose portion is forced through said opening, it abuts against said projection and forces said bent portions of said tab radially outwardly of said opening.

13. The combination set forth in claim 12 wherein said tab extends from the periphery of said opening at a point remote from said one end of said first section of the fastener.

14. The combination set forth in claim 12 wherein the second transverse bend line lies between said aperture and the free end of the tab.

15. The combination set forth in claim 12 wherein said nose portion is generally cylindrical, the forward end of said nose portion being tapered inwardly.

16. The combination set forth in claim 15 wherein the transverse dimension of said opening in said first section is substantially equal to the diameter of said nose portion.

17. A sheet metal fastener for mounting tubing on an apertured wall panel comprising a base having a tab thereon projecting downwardly generally transversely of the plane of the base, said fastener including an arched portion extending upwardly from the base and terminating in a nose member generally overlying said tab, said base being adapted to be positioned against a wall panel with the tab extending through the aperture in the panel, said arched portion being displaceable to direct the nose member when struck with a downward force axially past said tab and through the opening in the panel, said tab providing an obstruction to the free passage of the nose member through the panel aperture, said obstruction being deformed by the nose member when driven through the panel aperture to clinch the fastener on the panel, said fastener being formed of a non-resilient, permanently deformable sheet metal and adapted to engage a portion of a tube between the arched portion and the base whereby the tubing is secured to the fastener when the nose member is driven through the panel aperture to clinch the fastener on the panel, said base being provided with a lug inclined upwardly and toward said tab and said arched portion being provided with a lug adjacent the nose member and generally aligned with the first mentioned lug which, when the nose member is driven downwardly through the panel aperture, just clears the upper end of the inclined lug whereby when the nose member is driven downwardly as by a hammer blow, the inclined lug is engaged by the head of the hammer and clinched over the lug on the arched portion.

18. A fastener as called for in claim 17 wherein said arched portion between its connection with the base and said nose member has an upwardly bent portion defining a recess for encircling a tube.

References Cited in the file of this patent

UNITED STATES PATENTS

| 2,339,093 | Matheny | Jan. 11, 1944 |
| 2,588,251 | Kost | Mar. 4, 1952 |
| 2,618,824 | Poupitch | Nov. 25, 1952 |

FOREIGN PATENTS

| 1,124,412 | France | Oct. 10, 1956 |